Patented Mar. 19, 1940

2,194,416

UNITED STATES PATENT OFFICE 2,194,416

POLYMERIZATION PRODUCT

Walter Bock, Cologne-Riehl, Germany, assignor to I. G. Farbenindustrie Aktiengesellschaft, Frankfort-on-the-Main, Germany No Drawing. Application February 21, 1939, Serial No. 257,653. In Germany February 21, 1938

2 Claims. (Cl. 260—93)

The present invention relates to new polymerization products and to the process of preparing the same.

It has been found that 1-furylbutadienes-1.3, i. e., compounds having a butadiene radical attached to furane in α-position thereof, yield new and valuable polymerization products. The term 1-furyl-butadienes-1.3 is intended to include the unsubstituted product as well as substitution products having one or several of the hydrogen atoms replaced by alkyl groups. As an example for such a substitution product there may be mentioned the 1-furylisoprenes-1.3.

In accordance with a preferred method of working, the polymerization of the said materials is effected in aqueous emulsion. Suitable emulsifying agents for the purpose in question are, for instance, sodium oleate, alkylated naphthalene sulfonic acids and salts of higher fatty amines. Furthermore, oxygen or oxygen yielding substances such as potassium persulfate, hydrogen peroxide and the like and also compounds exerting a regulating effect upon the course of the polymerization such as dialkyl xanthogen disulfides can be employed. As a result of the emulsion polymerization the polymeric products are obtained in form of a latex and can be employed as such or after coagulation for various purposes. The solid polymeric products obtained in the manner described represent high molecular thermoplastic materials which are insoluble in alcohols and soluble in aromatic hydrocarbons, esters and cyclic amines such as pyridine. The furyl butadienes can also be polymerized by allowing the same to stand at ordinary temperature, the polymerization being accelerated by the application of higher temperature or by the presence of oxygen or oxygen yielding substances of the manner described above. The resulting highly viscous products can also be employed for practical purposes.

Regardless of the method of polymerization employed the resulting polymeric products are capable of hardening if exposed to the air and of being converted thereby into materials of a high resistance towards elevated temperatures; they are practically insoluble in solvents and are no longer capable of being molten. This hardening effect which is accompanied by a taking up of oxygen, can be accelerated by heating. These valuable properties of my new products can be made use of for the preparation of coatings or films of extremely good fastness properties. To this end, the polymeric products are dissolved (prior to the hardening) in a suitable solvent such as a mixture of aromatic hydrocarbons and esters of aliphatic acids, surfaces are coated by means of these solutions, the solvents are caused to evaporate and the resulting coatings or films are contacted with the air, preferably at an elevated temperature. In order to prevent a premature hardening of the products prior to the practical application thereof, stabilizing agents such as amines or aromatic hydroxy compounds are added to the polymerizate.

Another feature of my invention resides in that the monomeric 1-furylbutadienes-1.3 or products of the initial polymerization thereof are applied to any surface and caused to polymerize by exposing the same to oxygen or to the air. In this manner there can be obtained coatings of a high adhesive capacity and of excellent fastness properties. This method of working can be applied with particular advantage to those 1-furylbutadienes-1.3 which are substituted in 1- and/or 4-position by alkyl groups as these products show a low tendency of being polymerized according to the usual emulsion or heat polymerization processes. Owing to the said capability of drying my products can be employed as a substitute for drying oils.

I wish it to be understood that in the processes described in the preceding paragraphs the 1-furylbutadienes-1.3 can also be employed in admixture with other polymerizable compounds so that mixed polymerization products are obtained. In accordance therewith, the term "polymeric 1-furylbutadienes-1.3" wherever it occurs in the description and claims is intended to include also such mixed polymerizates.

As a matter of fact my new products can be employed in combination with softeners, pigments, filling materials and also in combination with other lacquer raw materials such as natural drying oils.

The monomeric products can be prepared by reacting with saturated aliphatic aldehydes or ketones upon furfurol and then causing magnesium alkyl halogenides to react upon the condensation products thus formed, whereupon water is split off from the unsaturated hydroxy compounds obtained. The splitting off of water is mostly effected by distillation.

The following examples illustrate the present invention without, however, restricting it thereto, the parts being by weight unless otherwise stated:

Example 1

100 parts of 1-furfurylbutadiene-1.3 are emulsified with 200 parts by volume of a 10% aqueous sodium oleate solution and shaken for 1 day at 35° and then for 2 days at 50° C. with the addition of 0.5 part of potassium persulfate and 1 part of a dialkyl xanthogen disulfide. 2 parts of pyrogallol are added to the yellowish-colored latex thus obtained for stabilization. The latex is then coagulated in the usual manner, whereupon the coagulate is dried at 40° in an atmosphere of nitrogen at a reduced pressure. The polymerizate thus formed is soluble in aromatic hydrocarbons and esters yielding viscous solutions which on evaporating yield transparent elastic films; on heating, for instance to about 150°, the product becomes hard and infusible. Polymerizates having incorporated therewith aliphatic amines as stabilizers show a considerable hardening effect even at room temperature after 1-2 days.

A product of similar properties is obtained by replacing the 100 parts of 1-furylbutadiene-1.3 by a mixture of 75 parts of the said furylbutadiene and 25 parts of styrene.

Example 2

150 parts of 1-furyl-3-methylbutadiene are emulsified in 330 parts of a 10% sodium oleate solution and allowed to polymerize with the addition of 0.6 part of potassium persulfate at 50–55° for 3 days. To the yellowish-colored latex thus obtained there are added 1.5 parts by volume of diethylamine, whereupon it is coagulated by means of methanol; on precipitating the product is dried in a stream of nitrogen. The thermoplastic product is soluble in a mixture of benzene, xylene and butyl acetate. Coatings prepared therefrom if heated to 170° for 1 hour show a high elasticity and adherence and do not become soft even on heating to 300–310°.

Example 3

100 parts of 1-furyl-2-methylbutadiene are emulsified with a solution of

| | Parts |
|---|---|
| Potassium persulfate | 0.5 |
| 19.6% sodium hydroxide solution | 2.05 |
| Oleic acid | 2 |
| Sodium salt of di-isobutyl naphthalene-1-sulfonic acid | 5 |
| Sodium pyrophosphate | 0.83 |
| Water | 141 | and then allowed to polymerize at about 50° for 3–4 days. On working up as described above a polymerizate is obtained which is similar to the compound of Example 2.

Example 4

When providing the surface of a metal or glass sheet of 100–150 square centimeters with a layer consisting of 1.5–2 parts of 1-furyl-4-methylbutadiene-1.3, the layer becomes more and more viscous and is completely dry after a few hours. Similar results are obtained when working with 1-furyl-1-methylbutadiene-1.3 (prepared from acetyl furane by the reaction with allyl halogenides and subsequent splitting off of water), or with 1-furyl-4.4-dimethylbutadiene-1.3 and 1-furyl-4-n-propylbutadiene-1.3.

I claim:
1. Polymeric 1-furylbutadienes-1.3.
2. Emulsions of polymeric 1-furylbutadienes-1.3.

WALTER BOCK.